(12) United States Patent
Jahkonen et al.

(10) Patent No.: US 8,183,813 B2
(45) Date of Patent: May 22, 2012

(54) POWER SUPPLY ARRANGEMENT

(75) Inventors: Pekka Jahkonen, Hyvinkää (FI); Antti Kallioniemi, Jokela (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/835,512

(22) Filed: Jul. 13, 2010

(65) Prior Publication Data

US 2010/0301793 A1 Dec. 2, 2010

Related U.S. Application Data (63) Continuation of application No. PCT/FI2009/000029, filed on Feb. 26, 2009.

(30) Foreign Application Priority Data

Feb. 29, 2008 (FI) .................................... 20080168

(51) Int. Cl.
*H02P 27/04* (2006.01)
(52) U.S. Cl. ........................................ 318/503; 318/494
(58) Field of Classification Search .................. 318/494, 318/503
See application file for complete search history.

(56) References Cited

U.S. PATENT DOCUMENTS

| 4,506,766 A * | 3/1985 | Watanabe | 187/290 |
| 6,438,335 B1 * | 8/2002 | Kinouchi et al. | 399/67 |
| 7,176,653 B2 * | 2/2007 | Jahkonen | 318/807 |
| 7,330,363 B2 * | 2/2008 | Ponnaluri et al. | 363/71 |
| 2003/0112643 A1 | 6/2003 | Salama | |
| 2004/0095099 A1 | 5/2004 | Salama | |
| 2006/0056206 A1 * | 3/2006 | Kifuku et al. | 363/15 |
| 2006/0103342 A1 * | 5/2006 | Mechi | 318/801 |
| 2007/0008745 A1 * | 1/2007 | Joshi et al. | 363/21.01 |
| 2007/0029963 A1 * | 2/2007 | Iura et al. | 318/811 |
| 2007/0063668 A1 * | 3/2007 | Schnetzka et al. | 318/812 |
| 2009/0284079 A1 | 11/2009 | Jahkonen | |

FOREIGN PATENT DOCUMENTS

| EP | 0 693 820 A1 | | 1/1996 |
| FI | 108819 B | | 3/2002 |
| FI | 110461 B | | 1/2003 |
| FI | 120855 B | | 3/2010 |
| JP | 55103093 A | * | 8/1980 |
| JP | 1-92188 A | | 4/1989 |
| JP | 1-321277 A | | 12/1989 |

* cited by examiner

*Primary Examiner* — Walter Benson
*Assistant Examiner* — Kawing Chan
(74) *Attorney, Agent, or Firm* — Birch, Stewart, Kolasch & Birch, LLP (57) ABSTRACT

The invention relates to a frequency converter, which is fitted to supply power between a polyphase alternating electricity source and an electric machine. The frequency converter comprises a network rectifier connected to the alternating electricity source and an inverter connected to the electric machine. The power supply is implemented in the network rectifier and in the inverter with solid-state change-over switches, which change-over switches comprise an antiparallel-connected diode fitted in parallel with the controllable switch. The network rectifier and the inverter are connected to each other with an intermediate circuit, which intermediate circuit is implemented without a passive energy storage.

10 Claims, 6 Drawing Sheets

POWER SUPPLY ARRANGEMENT

CROSS REFERENCE TO RELATED APPLICATIONS

This application is a Continuation of PCT International Application No. PCT/FI2009/000029 filed on Feb. 26, 2009, which claims the benefit of Patent Application No. 20080168 filed in Finland, on Feb. 29, 2008. The entire contents of all of the above applications is hereby incorporated by reference into the present application.

FIELD OF THE INVENTION

The object of the invention is a frequency converter a, a method for manufacturing a frequency converter, a method for controlling a frequency converter, and also a power supply arrangement of a transport system.

DESCRIPTION OF RELATED ART

Frequency converters are used for supplying power e.g. between a polyphase electricity network and an electric motor. The power supply between the electricity network and the frequency converter occurs in this case with a network rectifier, and the power supply between the frequency converter and the electric motor occurs with an inverter. The network rectifier and the inverter are connected to each other with an intermediate circuit. The network rectifier rectifies the power of the electricity network into intermediate circuit power, and the inverter further transforms the aforementioned intermediate circuit power into alternating electricity for the electric motor. Power control occurs with solid-state switches. Conventionally, a passive energy storage, such as a choke or a capacitor, is fitted to the intermediate circuit of the frequency converter. If the intermediate circuit comprises a choke, it is called a frequency converter with current intermediate circuit and if the intermediate circuit comprises a capacitor, it is called a frequency converter with voltage intermediate circuit. By means of a passive energy storage it is endeavored to reduce transient fluctuations of the intermediate circuit power. These types of transient fluctuations are caused by at least the operation of the solid-state switches of the frequency converter.

The operation of the solid-state switches of the frequency converter cause fluctuations in transient power also on the electricity network side, and for this reason a separate energy storage, such as inductance, is indeed often added to the phases of the network rectifier.

With the passive energy storage fitted to the intermediate circuit it is endeavored to reduce a change, and the speed of the change, of the intermediate circuit current or the intermediate circuit voltage, e.g. during a control error of the frequency converter. A sudden and uncontrolled change in the intermediate circuit voltage or the intermediate circuit current can easily result in the destruction of the solid-state switches of the frequency converter.

The aforementioned passive energy storages are of large size, and they often form the largest individual space-consuming part in the mechanics of a frequency converter. In modern power supply systems, especially in urban areas, the need for space is often a problem, and disposing frequency converters e.g. in buildings might require special engineering. The need for space is also a problem e.g. in modern elevator systems without machine rooms, in which the frequency converter is disposed in the elevator hoistway or e.g. on a stopping floor of the elevator.

Publication F175700 presents a method and a power supply apparatus for controlling the power of a direct-current voltage source between a three-phase network and the direct-current voltage source. As presented in the publication, the transistors of the power supply apparatus are connected such that the transistor connected to the positive pole of the direct-current voltage source is connected to be conductive in the phase of the power supply apparatus in which the voltage of the three-phase network connected to the power supply apparatus is greatest, and the transistor connected to the negative pole of the direct-current voltage source is connected to be conductive in the phase of the power supply apparatus in which the voltage of the three-phase network is smallest.

SUMMARY OF THE INVENTION

The purpose of this invention is to solve the aforementioned problems as well as the problems disclosed in the description. In this case a new type of frequency converter is disclosed the invention, which frequency converter is smaller than prior art in both its size and in its dimensioning needs, and which is also structurally simpler and more reliable than prior art.

The frequency converter according to the invention is made to be smaller in size than prior art by omitting the passive energy storages that affect the passage and the speed of change of the current and voltage that are conventionally fitted in connection with the intermediate circuit of the frequency converter. These types of energy storages are e.g. chokes and capacitors. The passage of the current in the main circuit of the frequency converter is according to the invention controlled by combining the monitoring of the functioning of the frequency converter with the control of the solid-state switches. According to the invention the control of the solid-state switches of the network rectifier and of the inverter is made such that the passage of the current between the alternating electricity source and the electric machine is possible in all the control situations of the frequency converter, and the current path of the electric machine is not disconnected. In one embodiment of the invention the transient speed of change in the intermediate circuit power is also reduced by controlling one of the changeover switches of the inverter at a time to be continuously conductive.

When the passive energy storage fitted in connection with the intermediate circuit of the frequency converter is omitted according to the invention, the solid-state switches of the frequency converter receive the energy needed for commutation directly from the energy of the magnetic field of the winding of the electric machine.

The frequency converter according to the invention is fitted to supply power between a polyphase alternating electricity source and an electric machine. The frequency converter comprises a network rectifier connected to an alternating electricity source as well as an inverter connected to an electric machine. The power supply in the network rectifier and in the inverter is implemented with solid-state switches. This type of changeover switch comprises two solid-state switches connected in series. An antiparallel-connected diode is fitted in parallel with the controllable switch in the solid-state switch of the changeover switch. The network rectifier and the inverter are connected to each other with an intermediate circuit, which intermediate circuit is implemented without a passive storage. The positive changeover contact of the network rectifier is controlled to be continuously conductive in the phase of the network rectifier in which the transient value of the phase voltage is greatest, for supplying power between the alternating electricity source and the intermediate circuit. The negative changeover contact of the network rectifier is controlled to be continuously conductive in the phase of the network rectifier in which the transient value of the phase voltage is smallest, for supplying power between the alternating electricity source and the intermediate circuit. In one embodiment of the invention the frequency converter comprises a determination for detecting an operational deviation, and the control of the changeover switches of the inverter is fitted to be disconnected on the basis of the determined operational deviation.

In the method according to the invention for manufacturing a frequency converter, a network rectifier and an inverter are made from solid-state changeover switches; an intermediate circuit without a passive energy storage is made between the network rectifier and the inverter; a network rectifier control is fitted to the frequency converter, and a determination of the phase voltages of the network rectifier is fitted in connection with the control. In one method according to the invention a determination for detecting an operational deviation is fitted to the frequency converter; and also determination of an operational deviation is fitted in connection with a disconnection of the control of the changeover switches of the inverter.

In the method according to the invention for controlling a frequency converter, the positive changeover contact of the network rectifier is controlled to be continuously conductive in the phase in which the transient value of the supply voltage is greatest; the negative changeover contact of the network rectifier is controlled to be continuously conductive in the phase in which the transient value of the phase voltage is smallest; and also the changeover switch of the inverter is controlled to be continuously conductive in the phase of the inverter in which the transient value of the supply voltage is greatest in absolute value.

The power supply arrangement of a transport system according to the invention comprises a transport appliance and also an electric motor drive for moving the transport appliance. The transport appliance is fitted to be moved with an electric motor, the power supply of which electric motor is fitted to occur with the solid-state changeover switches of the frequency converter that the electric drive comprises. The frequency converter comprises a network rectifier, which is connected to the alternating electricity source of the transport system, and also an inverter, which is connected to the phases of the electric motor. An antiparallel-connected diode is fitted in parallel with the controllable switch in the changeover switches. The aforementioned network rectifier and inverter are connected to each other with an intermediate circuit, which intermediate circuit is implemented without a passive energy storage. The positive changeover contact of the network rectifier is controlled to be continuously conductive in the phase of the network rectifier in which the transient value of the phase voltage of the alternating electricity source is greatest, for supplying power between the alternating electricity source and the intermediate circuit, and the negative changeover contact of the network rectifier is controlled to be continuously conductive in the phase of the network rectifier in which the transient value of the phase voltage of the alternating electricity source is smallest, for supplying power between the alternating electricity source and the intermediate circuit. The frequency converter comprises a determination for detecting an operational deviation, and the control of the changeover switches of the inverter is fitted to be disconnected on the basis of the determined operational deviation. The movement of the transport appliance is fitted to be stopped by controlling the brake of the transport appliance on the basis of the aforementioned determined operational deviation.

The transport system referred to in the invention can be e.g. an elevator system, an escalator system, a travelator system, a positive drive elevator system, a crane system or a vehicle system. The term transport appliance refers to a functional part of a transport system, with which the object to be transported is moved.

The determination of the operational deviation of the frequency converter can be performed e.g. on the basis of some measured or estimated electrical parameter, such as voltage, current or transient power, of the frequency converter. The determination can also occur e.g. on the basis of the field state of the solid-state switches, or on the basis of the temperature of the switches. In the transport system according to the invention the determination of an operational deviation can also occur for instance on the basis of monitoring the movement of the transport appliance, or on the basis of monitoring the state of a safety circuit of the transport system.

The electric machine according to the invention can be some prior-art alternating-current motor, e.g. a synchronous motor, permanent-magnet motor or squirrel-cage motor, or on the other hand the electric machine can also be, for instance, an alternating-current generator.

When an electric motor is used to move a transport appliance, the motor can also comprise a mechanical fitting for transmitting power between the motor and the transport appliance. This type of fitting can be e.g. a shaft, a gearbox or, for instance, the traction wheel of an elevator machine.

In one embodiment of the invention all the changeover switches of the inverter are controlled into the same switching state at the switching moment of the changeover switch of the network rectifier. In this case, on the basis of the switching state of the switches of the inverter, the current of the intermediate circuit is determined to reduce to zero with a certain time delay, and the changeover switches of the network rectifier are controlled on the basis of the aforementioned determination of the current of the intermediate circuit.

The solid-state switches referred to in the invention can be e.g. IGBT transistors, MOSFET transistors, thyristors, SCR (silicon controlled rectifier) switches, or bipolar transistors.

The invention also comprises the concept of increasing the dimensioning of the power range of the frequency converter by reducing in stages the capacity of the passive energy storage fitted to the intermediate circuit as well as by reducing at the same time the switching frequency of the network rectifier. In this case the same basic concept of the frequency converter can be converted for loads of different power.

In one embodiment of the invention the high-capacitance capacitor, such as an electrolytic capacitor, that is conventionally disposed in the intermediate circuit of a frequency converter and that functions as a passive energy storage is replaced with a low-capacitance interference filtering capacitor, such as an aluminium capacitor or a ceramic capacitor. The capacitance of this type of conventional electrolytic capacitor has generally been over one hundred microfarads, normally in the range of 400-500 microfarads, whereas the capacitance of the interference filtering capacitor replacing it is clearly below one hundred microfarads. This kind of interference filtering capacitor does not function as a passive energy storage in the same way as a conventional high-capacitance or high-inductance energy storage.

In one embodiment of the invention at least two inverters are connected to the same intermediate circuit of the frequency converter. In this case the first inverter is connected to the first electric machine and the second inverter is connected to the second electric machine. In one embodiment of the invention the switching cycles of the changeover switches of the aforementioned first and second inverter are interphased such that the switching in the changeover switches of the first and second inverter occurs on average at a different moment of time. In this way the fluctuation of the transient power in the intermediate circuit can be reduced.

One advantage of the invention is that when the passive energy storage is omitted from the main circuit of the frequency converter, the size of the frequency converter decreases. This saves space and makes installation of the frequency converter easier. The lifetime of passive energy storages, such as of electrolytic capacitors, is linked to the ambient temperature. Inside a frequency converter the temperature rise of especially the solid-state switches cause the lifetime of the capacitors, and also at the same time of the frequency converter, to shorten.

When the solid-state changeover switches of the network rectifier are controlled according to the invention, one positive and one negative changeover contact is always in a conducting state when current is traveling in the DC circuit. In this case the current path from the intermediate circuit to the alternating electricity source is open. Further, when the passage of the current between the intermediate circuit and the electric machine is enabled with the control of the switches of the inverter, the current path between the alternating electricity source and the winding of the electric machine is open. Thus the passage of the current in the main circuit of the frequency converter can be controlled without a passive energy storage fitted into the intermediate circuit.

When the control of the changeover switches of the inverter is disconnected on the basis of an operational deviation of the frequency converter, the passage of the current in the intermediate circuit stops. It is possible with the disconnection of the control of the switches in this case to prevent sudden changes of intermediate circuit voltage or current, which would otherwise result in damage of the solid-state switches in the type of frequency converter in which a passive energy storage is not fitted to the intermediate circuit.

When the solid-state changeover switches of the network rectifier are fitted alternately with the solid-state changeover switches of the inverter consecutively onto the same heatsink, the changeover switches of the inverter can be disposed farther apart from each other, which improves their cooling. That is to say that in a certain control situation there is a strong temperature rise in the switch of the inverter, in which case the heatsink warms up locally at the point of the switch, and the passage of the heat from the switch of the inverter via the heatsink to the environment is impaired. When the switches are disposed farther apart from each other and the type of switch of the network rectifier that does not warm up in the same way in a corresponding control situation is disposed between the switches, the local warming of the heatsink is reduced, the heatsink warms more evenly, and the heat transmission capability of the heatsink increases. In this case also the thermal stressing of the changeover switches decreases and the lifetime of the switches is extended. In this case the changeover switches of the frequency converter can also be dimensioned for a larger current.

When the changeover switch of the inverter is controlled to be continuously conductive in the phase of the inverter in which the transient value of the supply voltage is greatest in absolute value, the transient fluctuation of the power to be supplied in the intermediate circuit of the frequency converter is reduced. Since the transient fluctuation of power in the phases of the network rectifier is comparable to the power fluctuation of the intermediate circuit, the harmonics of the power and of the current transferred to the alternating electricity source via the phases of the network rectifier are now also reduced. When using an electric machine, the power factor of which is 80-95 percent, the essentially largest current also travels in the phase of the largest absolute voltage. In this case switching interference does not occur either when the changeover switch is conducting continuously, in which case the temperature rise of the semiconductors of the frequency converter is reduced. One electric machine that possesses this type of large power factor is a permanent-magnet synchronous motor.

In one embodiment of the invention capacitors are connected between the phases of the network rectifier for filtering the current of the alternating electricity source. In this case the interference caused in the current of the alternating electricity source from the operation of the changeover switches of the frequency converter can be reduced with the aforementioned capacitors.

One advantage of the transport system according to the invention is that the electric drive of the transport system can be made to be of smaller size than in prior art. Another advantage of the transport system according to the invention is the improved safety in connection with an operational deviation. An improvement in safety is achieved by controlling the brake that stops the transport appliance at the same time as the power supply from the alternating electricity source to the electric motor is prevented by disconnecting the control of the changeover switches of the inverter.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
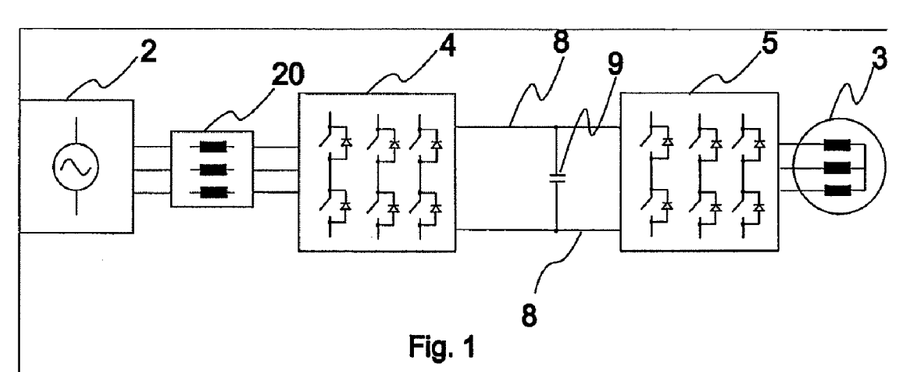
FIG. 1 presents a frequency converter with a voltage intermediate circuit according to prior art.

FIG. 1 presents a prior-art frequency converter with a voltage intermediate circuit. The network rectifier 4 and the inverter 5 in the frequency converter are connected to each other with a DC-voltage intermediate circuit 8. A high-capacitance capacitor 9 is added to the DC-voltage intermediate circuit, the capacitance of which is normally several hundreds of microfarads. With this passive energy storage it is endeavored to reduce the transient fluctuation of voltage in the intermediate circuit. The frequency converter also comprises a separate three-phase choke 20, with which it is endeavored to reduce the harmonics of the network current, connected between the electricity network 2 and the network rectifier 4.

Figure 2:
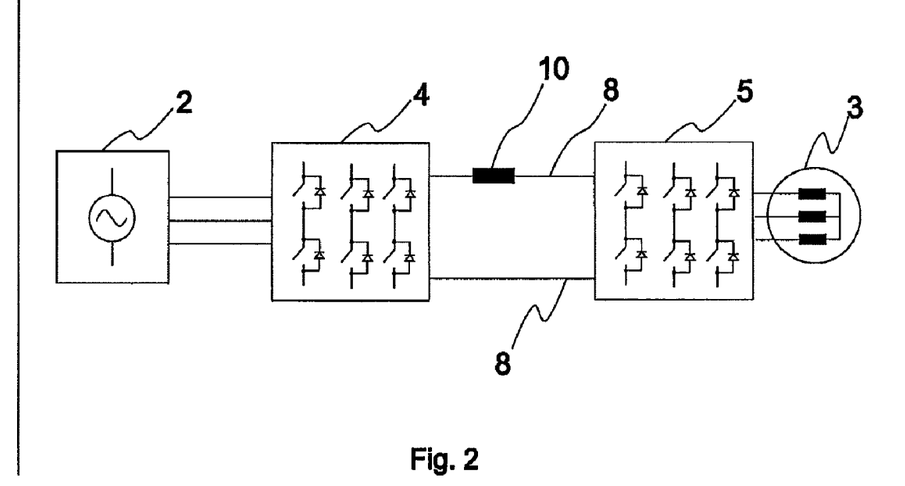
FIG. 2 presents a frequency converter with a current intermediate circuit according to prior art.

FIG. 2 presents a prior-art frequency converter with a current intermediate circuit. In this case the high-inductance choke 10, with which it is endeavored to reduce transient fluctuation of the intermediate circuit current, is the passive energy storage in the intermediate circuit 8. The choke is generally of a magnitude of several millihenrys.

Figure 3:
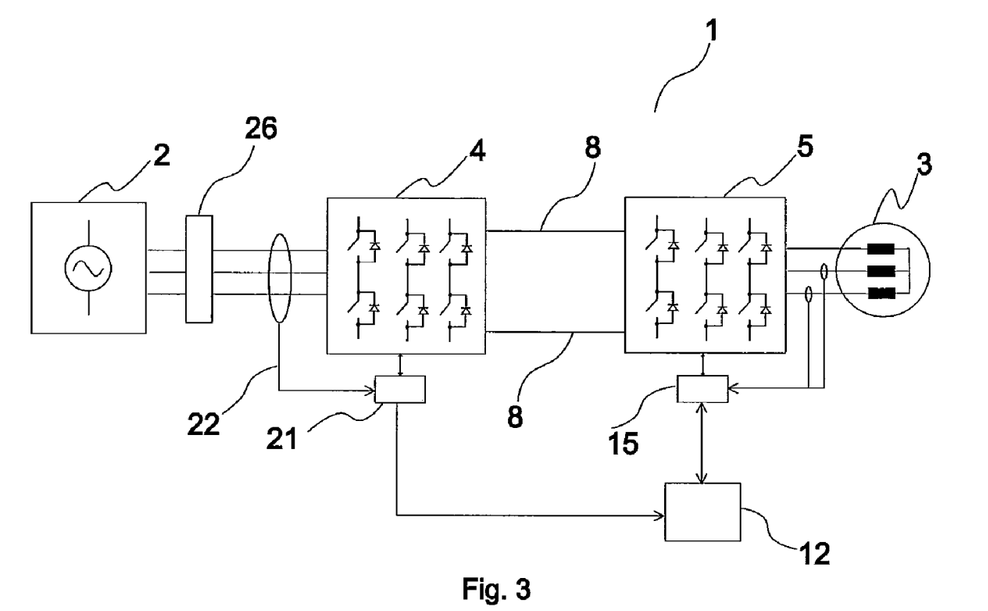
FIG. 3 presents a frequency converter according to the invention.

FIG. 3 presents a frequency converter 1 according to the invention. The frequency converter is connected to supply power between the electric motor 3 and the electricity network 2. The phases of the network rectifier 4 are connected to the phases of the electricity network 2. The phases of the inverter 5 are connected to the phases of the electric motor 3. The network rectifier 4 and the inverter 5 are connected to each other with an intermediate circuit 8, which intermediate circuit is implemented without a passive storage, such as a capacitor 9 or choke 10. The power supply in the network rectifier and in the inverter is implemented with solid-state switches. The changeover switches comprise an antiparallel-connected diode fitted in parallel with a controllable IGBT transistor. An EMC filter 26, which filters interference caused by frequencies of over 150 Khz produced in the operation of the frequency converter, is added to the electricity network 2 side of the frequency converter 1.

Figure 10:
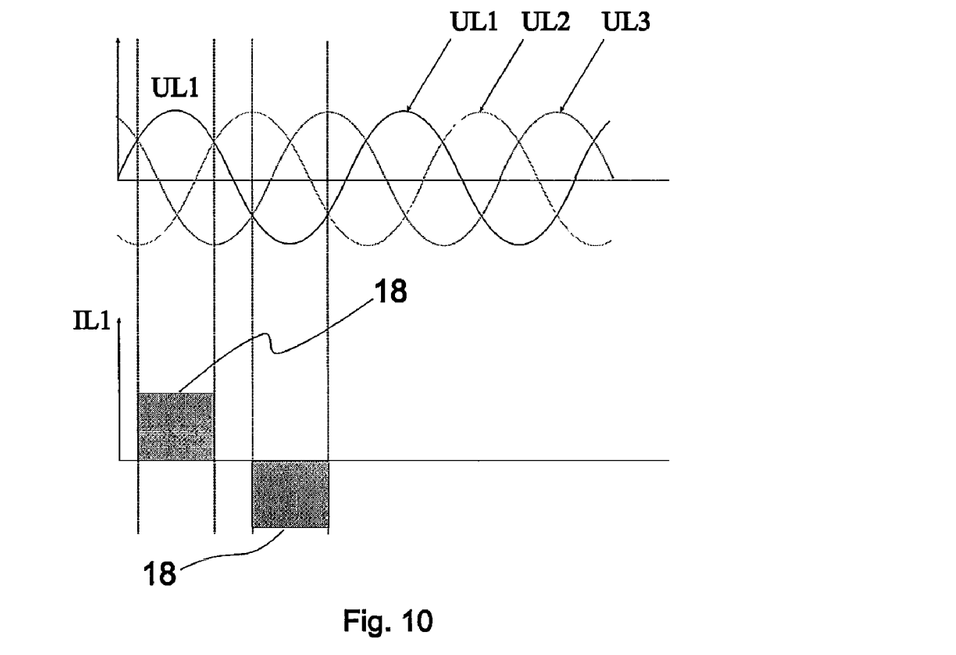
FIG. 10 presents a control of the changeover switches of a network rectifier according to the invention.

A measurement 22 of network voltage is in connection with the control 21 of the network rectifier. The changeover switches of the network rectifier 4 are controlled with the control according to FIG. 10 on the basis of the measured network voltage UL1,UL2,UL3 such that the IGBT transistor in the positive changeover contact 6A is controlled to be continuously conductive 18 in the phase of the network rectifier in which the transient value of the measured network voltage is the greatest, and the IGBT transistor in the negative changeover contact 6B is controlled to be continuously conductive 18 in the phase of the network rectifier in which the transient value of the measured network voltage is the smallest. When the direction of the current of the intermediate circuit in the positive busbar 8A is towards the electricity network, the graph of the current receives essentially the same type of shape in all the phases of the electricity network as for the phase IL1 of the current presented in FIG. 10. In this way the control of the network rectifier ensures that the current path between the electricity network and the direct-current intermediate circuit is open. Since the controllable changeover contacts also comprise antiparallel-connected diodes, it is also possible to control the IGBT transistors according to the direction of the current of the direct-current intermediate circuit such that the transistor is controlled to be conductive only when the direction of the current in the positive busbar 8A of the direct-current intermediate circuit is towards the electricity network, and in the negative intermediate circuit busbar 8B away from the electricity network.

Figure 6:
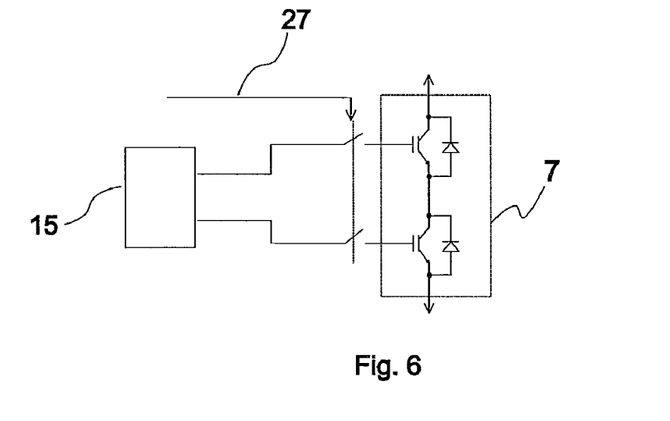
FIG. 6 presents a schematic diagram of a breaker circuit of the control of the solid-state switches fitted in connection with an inverter according to the invention.

A determination 12 of an operational deviation of the frequency converter is in connection with the control 15 of the inverter 5. The operational deviation is determined on the basis of the electrical parameters of the frequency converter, such as on the basis of the currents and voltages. Since the control of the frequency converter as such requires determination of certain electrical parameters, such as of the motor current and of the supply voltage of the motor as well as of the current and voltage of the intermediate circuit, the same parameters can also be used to determine an operational deviation. The determination of an operational deviation also monitors the switching state of the solid-state changeover switches of the frequency converter, and if a switching state that deviates from that desired is detected, or if an operational deviation from the electrical parameters of the frequency converter is detected, the passage of the current in the intermediate circuit 8 is prevented by disconnecting the control of the changeover switches of the inverter 5 e.g. by sending a control signal 27 to the breaker circuit according to FIG. 6.

Figure 9:
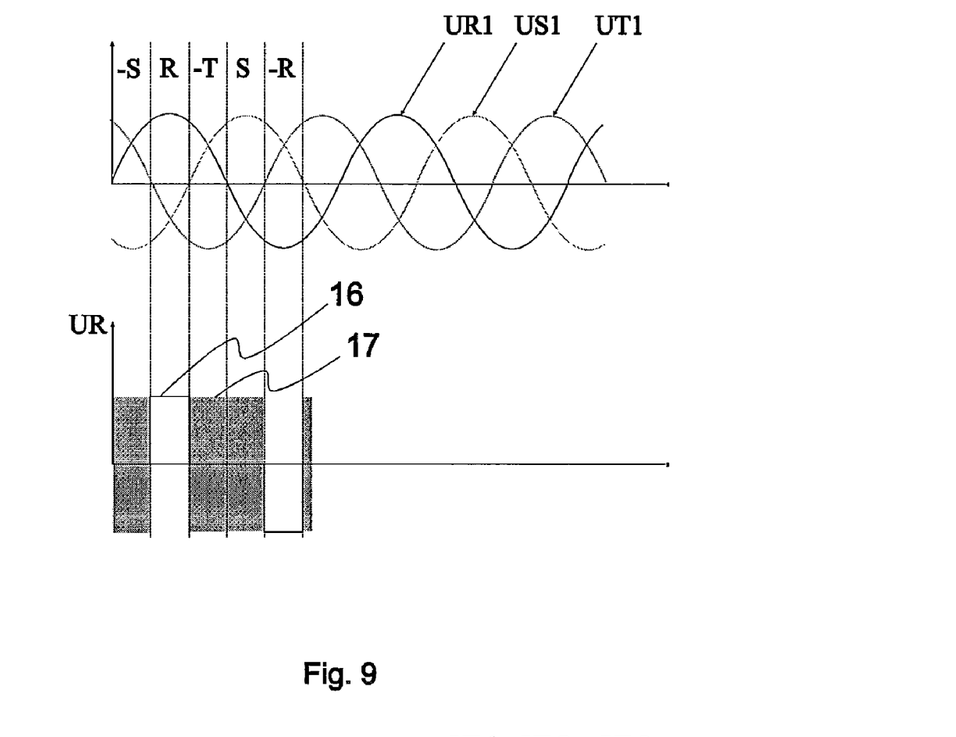
FIG. 9 presents a control of the changeover switches of an inverter according to the invention.

In one embodiment of the invention the changeover switches of the inverter according to FIG. 3 are controlled with a control according to FIG. 9. In this case the changeover switch of the inverter 5 is controlled to be continuously conductive 16 in the phase of the inverter in which the transient value of the supply voltage is greatest in absolute value. FIG. 9 presents the fundamental waves of the supply voltages of the electric motor 3 shown against zero, and also the control of the supply voltage of the phase UR of the inverter. An advantage of this type of control is that the fluctuation of the transient value of the power is reduced in the intermediate circuit 8 of the frequency converter.

Figure 4:
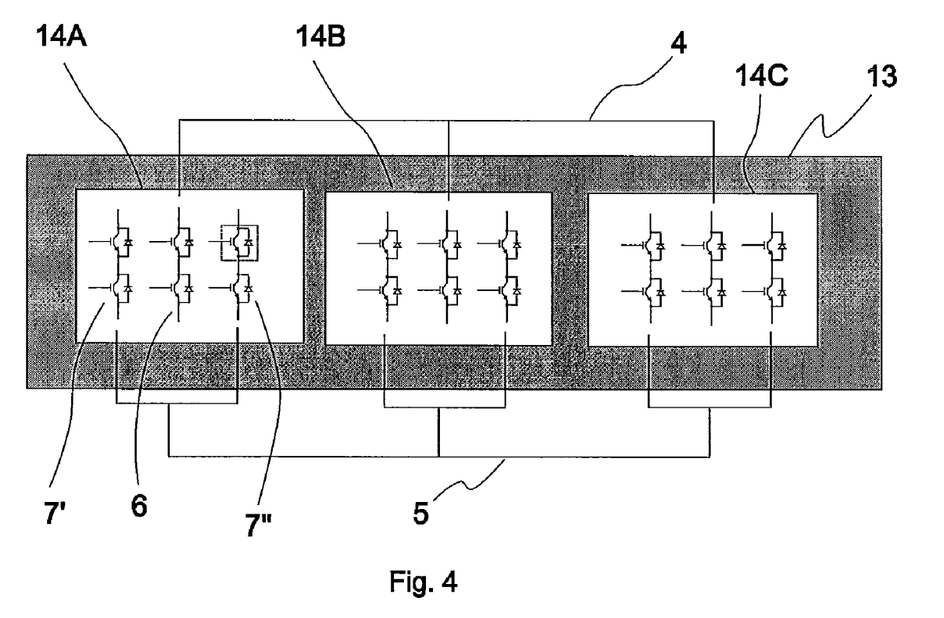
FIG. 4 presents one placement of the solid-state switches according to the invention.
Figure 7:
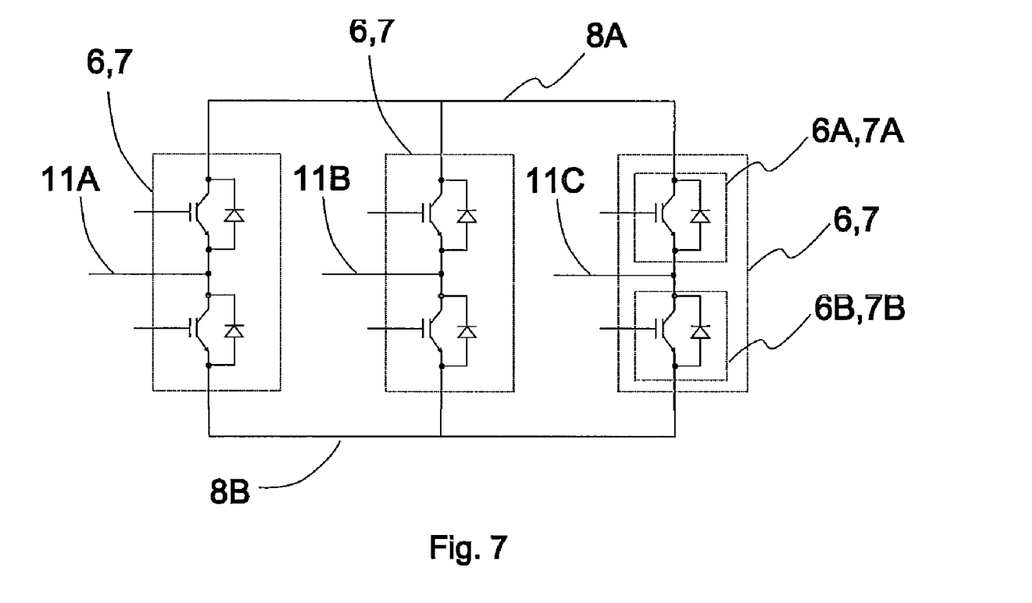
FIG. 7 presents a circuit diagram of the changeover switches of a network rectifier or of an inverter.
Figure 8:
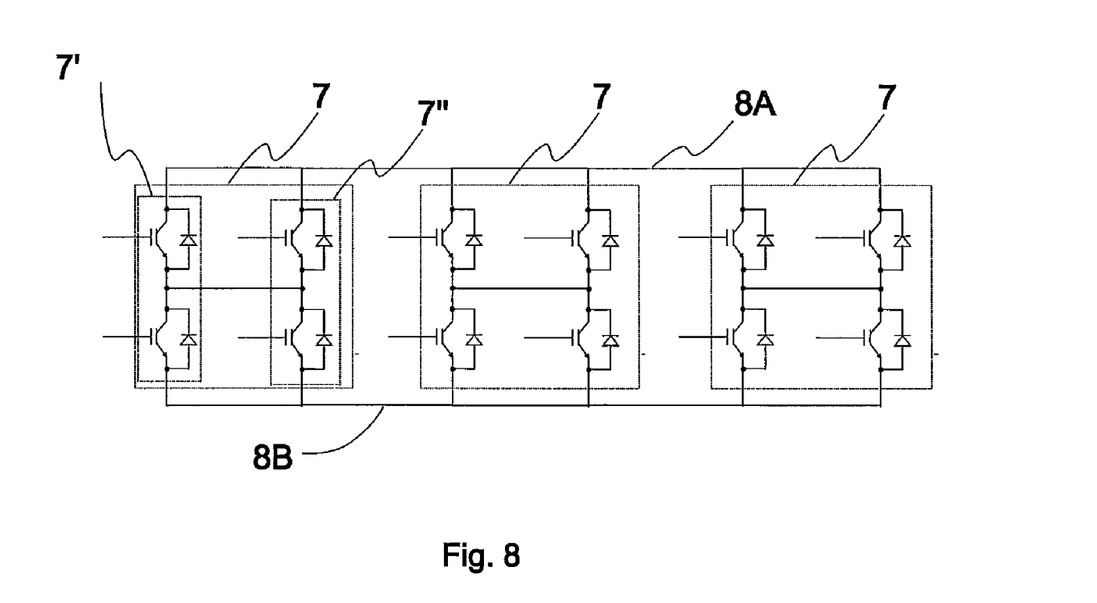
FIG. 8 presents a circuit diagram of the changeover switches of an inverter according to the invention.

FIG. 4 presents the placement of the solid-state switches. For example the switches of the frequency converters in the embodiments of FIG. 3 or 5 can be disposed in the manner stated. The solid-state changeover switches 6 of the network rectifier 4 are fitted alternately with the solid-state changeover switches 7 of the inverter 5 consecutively onto the same heatsink 13. The frequency converter 1 comprises three switch modules 14A,14B,14C, each of which switch modules comprises three adjacent changeover switches. The network rectifier 4 comprises three changeover switches 6, which are connected to the phases of a three-phase electricity network 2. The inverter 5 is also three-phase, comprising six solid-state changeover switches 7',7", of which two are connected in parallel with each other 7. The phase of the network rectifier is made using the centermost changeover switch 6 of the switch module 14A,14B,14C, and the phase of the inverter is made using the outermost changeover switches 7',7" of the switch module that are beside the aforementioned centermost changeover switch. The circuit diagram of the main circuit of the network rectifier 4 is in this case according to FIG. 7, and circuit diagram of the main circuit of the inverter 5 is according to FIG. 8.

Figure 5:
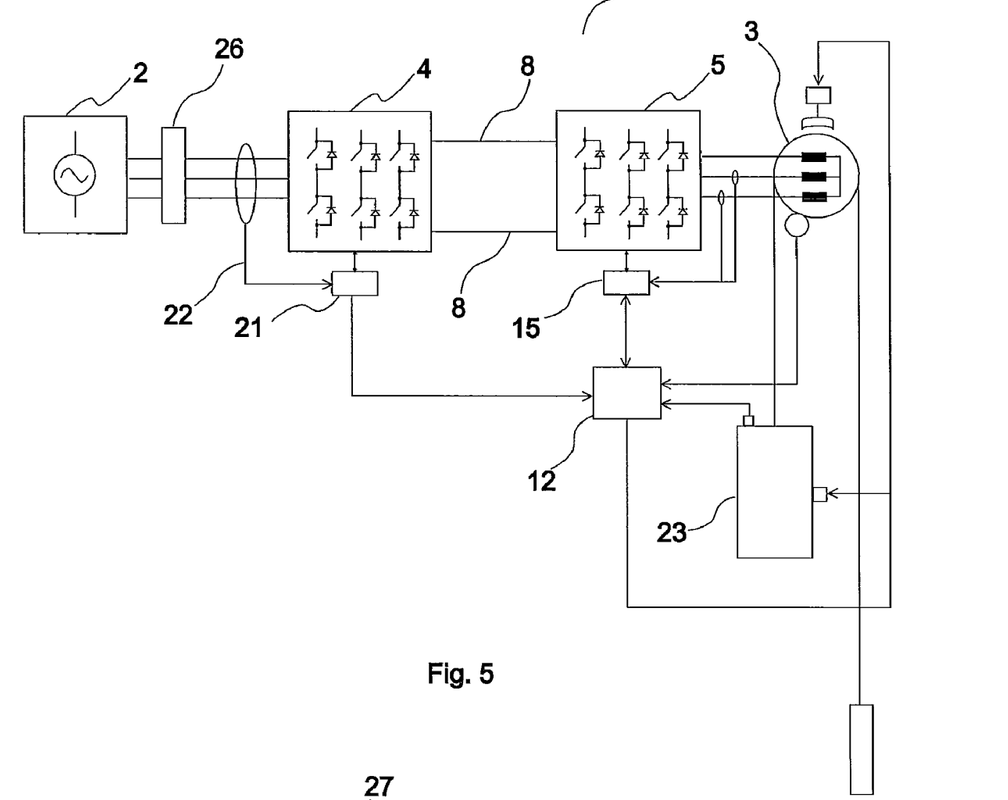
FIG. 5 presents a power supply arrangement of an elevator system according to the invention.

FIG. 5 presents a power supply arrangement of an elevator system, in which a frequency converter 1 according to the invention is fitted to the elevator system. The frequency converter is essentially of the type presented in FIG. 3. The frequency converter is fitted to supply power between the electricity network 2 and the elevator motor 3. In this case the elevator car 23 is moved in the elevator hoistway with the motor 3 via ropes. The frequency converter in this embodiment of the invention is fitted to determine an operational deviation on the basis of the movement of the elevator car 23 as well as on the basis of the state of the safety circuits of the elevator system, in addition to on the basis of the determination referred to in the embodiment of FIG. 3. The determination 12 of operational deviation in this case measures the movement of the elevator car on two channels, with an encoder connected to the elevator motor as well as with an acceleration sensor connected to the elevator car. In addition the determination 12 of operational deviation measures the state of the safety circuits of the elevator system, such as the state of the safety circuits of the landing door of the elevator as well as the state of the safety circuits that define the safety areas of the elevator hoistway. When an operational deviation is detected either in the operation of the frequency converter as described earlier, when an operational deviation is detected from the state of the safety circuits, or when the two-channel measurements of the movement of the elevator car differ from each other, or when a movement of the elevator car that differs from that permitted is detected, the control of the changeover switches of the inverter is disconnected with the breaker circuit according to FIG. 6, and in addition the movement of the elevator car is stopped by controlling at least the brake of the elevator motor and, when safety so demands it, e.g. when the elevator car is moving in the proximity of the end zones of the elevator hoistway, the safety gear that mechanically directly brakes the elevator car is also controlled.

Figure 11:
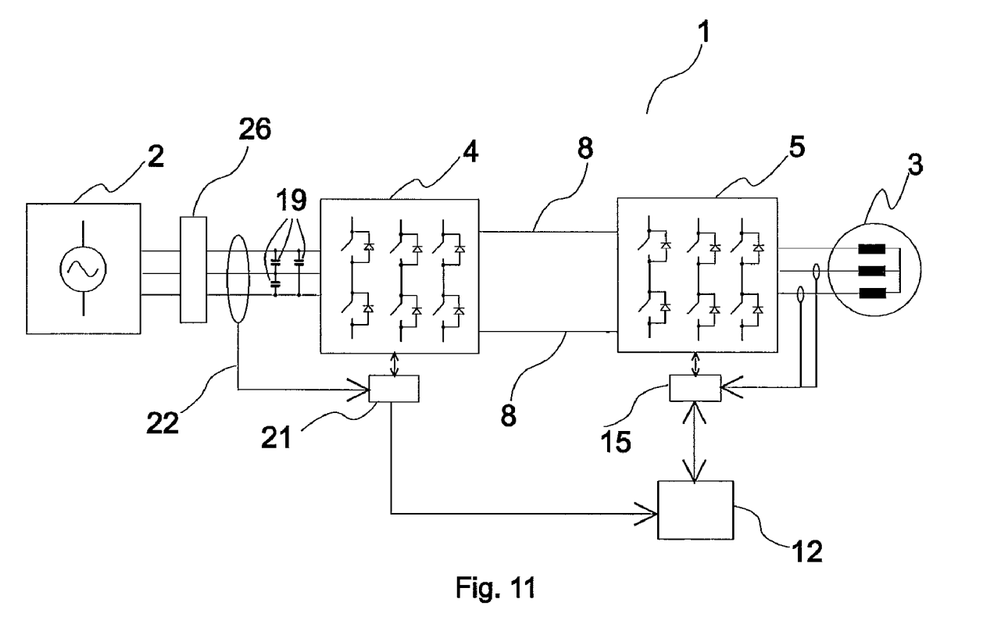
FIG. 11 presents a frequency converter according to the invention, which comprises a filtering arrangement for filtering interference caused to the current of the alternating electricity source from the operation of the frequency converter.

In the embodiment of the invention presented in FIG. 11 the frequency converter 1 is otherwise the same type as that presented in FIG. 3, but in addition the capacitors 19 are connected between the phases of the network rectifier 4 for filtering the current of the electricity network 2. In this case the interference caused to the current of the electricity network 2 from the operation of the frequency converter can be reduced with the aforementioned capacitors. The control of the switches of the frequency converter 1 causes a switching-frequency fluctuation in the current traveling in the intermediate circuit 8. The switching-frequency fluctuation of intermediate circuit current travels via the conducting switch of the network rectifier 4 to the phase of the network rectifier to which the aforementioned conducting switch is connected. Since the phases of the network rectifier are connected to the phases of the electricity network 2, the switching-frequency fluctuation of intermediate circuit current would thus travel onwards to the electricity network without capacitors connected between the phases of the network rectifier 4. By means of the capacitors the interference caused by the operation of the switches of both the inverter 5 and the network rectifier 4 can be reduced; most of the interference to be filtered is however caused by the operation of the inverter 5. As presented in FIG. 11, the capacitors 19 are connected between the phases into a delta, but the capacitors can just as well be connected e.g. into a star connection such that the first pole of the capacitor 19 is connected to the phase of the network rectifier 4 and the second poles of the capacitors are connected to a common neutral terminal.

The invention is described above by the aid of a few examples of its embodiment. It is obvious to the person skilled in the art that the invention is not limited to the embodiments described above, but that many other applications are possible within the scope of the inventive concept defined by the claims presented below.

The invention claimed is:

1. A frequency converter for supplying power between a polyphase alternating electricity source and an electric machine, the frequency converter comprising:
    a network rectifier connected to the alternating electricity source; and
    an inverter connected to the electric machine;
    in which power supply of the network rectifier and the inverter is implemented with solid-state changeover switches; in which changeover switches comprises an antiparallel-connected diode fitted in parallel with a controllable switch;
    wherein the network rectifier and the inverter are connected to each other with an intermediate circuit, which intermediate circuit is implemented without a passive storage;
    each positive changeover contact of the network rectifier is controlled to be continuously conductive in each respective phase of the network rectifier in which the transient value of the phase voltage is greatest, for supplying power between the alternating electricity source and the intermediate circuit;
    each negative changeover contact of the network rectifier is controlled to be continuously conductive in each respective phase of the network rectifier in which transient value of a phase voltage is smallest, for supplying power between the alternating electricity source and the intermediate circuit;
    the frequency converter comprises a determination for detecting an operational deviation; and a control of the changeover switches of the inverter is fitted to be disconnected on the basis of the detected operational deviation,
    wherein the inverter of the frequency converter is fitted to regulate a supply voltage of the electric machine with an inverter control for providing variable-frequency and variable-amplitude voltage or current therein; and in that each changeover switch of the inverter is controlled to be continuously conductive in each respective phase of the inverter in which a transient value of the supply voltage is greatest in absolute value, such that one changeover switch at a time is controlled to be continuously conductive, and
    wherein the current of the intermediate circuit is determined from the switching state of the changeover switches of the inverter; and in that at least one changeover switch of the network rectifier is controlled on the basis of the current of the intermediate circuit determined from the switching state of the changeover switches of the aforementioned inverter.

2. The frequency converter according to claim 1, wherein the solid-state changeover switches of the network rectifier are fitted alternately with the solid-state changeover switches of the inverter consecutively onto a same heat sink.

3. The frequency converter according to claim 1 or 2, wherein three switch modules are fitted to the frequency converter, each of which switch modules comprises three adjacent changeover switches;
    the network rectifier comprises three changeover switches, one connectable to each phase of an alternating electricity source;
    the inverter is three-phase, comprising six solid-state changeover switches, two changeover switches connected in parallel per phase of the inverter;
    the phase of the network rectifier is made using the centermost changeover switch of the switch module; and in that the phase of the inverter is made using the outermost changeover switches of the switch module that are beside the aforementioned centermost changeover switch.

4. The frequency converter according to claim 1, wherein capacitors are connected between the phases of the network rectifier for filtering current of the alternating electricity source.

5. The frequency converter according to claim 1, wherein filtering of current of the alternating electricity source is implemented without a high-inductance energy storage connected to the phases of the network rectifier.

6. A method for manufacturing a frequency converter, in which method:
    a network rectifier and an inverter are made from solid-state changeover switches, wherein:

an intermediate circuit without a passive energy storage is made between the network rectifier and the inverter;

a network rectifier control is fitted to the frequency converter, and a determination of phase voltages of the network rectifier is fitted in connection with the control;

the determination is fitted to the frequency converter for detecting an operational deviation; and the determination of the operational deviation is fitted in connection with a breaker of a control of the changeover switches of the inverter, wherein the inverter of the frequency converter is fitted to regulate a supply voltage of the electric machine with an inverter control for providing variable-frequency and variable-amplitude voltage or current therein; and in that each changeover switch of the inverter is controlled to be continuously conductive in each respective phase of the inverter in which a transient value of the supply voltage is greatest in absolute value, such that one changeover switch at a time is controlled to be continuously conductive, and wherein the current of the intermediate circuit is determined from the switching state of the changeover switches of the inverter; and in that at least one changeover switch of the network rectifier is controlled on the basis of the current of the intermediate circuit determined from the switching state of the changeover switches of the aforementioned inverter.

7. The method according to claim 6, wherein:

three switch modules are fitted to the frequency converter, each of which switch modules comprises three adjacent changeover switches;

centermost changeover switch of each switch module is fitted to a phase of the network rectifier; and two outermost changeover switches of each switch module are connected in parallel with each other, and the aforementioned parallel connection of the changeover switches is fitted to a phase of the inverter.

8. The method according to claim 6 or 7, wherein:

the phases of the network rectifier are fitted to be connected to the alternating electricity network without a high-inductance energy storage being connected to the phases of the network rectifier.

9. A method for controlling a frequency converter, wherein:

an intermediate circuit without a passive energy storage is provided between a network rectifier and an inverter;

a positive changeover contact of the network rectifier is controlled to be continuously conductive in a phase in which a transient value of a phase voltage is greatest;

a negative changeover contact of the network rectifier is controlled to be continuously conductive in the phase in which the transient value of the phase voltage is smallest; and a changeover switch of the inverter is controlled to be continuously conductive in a phase of the inverter in which a transient value of a supply voltage is greatest in absolute value, wherein the inverter of the frequency converter is fitted to regulate a supply voltage of the electric machine with an inverter control for providing variable-frequency and variable-amplitude voltage or current therein; and in that each changeover switch of the inverter is controlled to be continuously conductive in each respective phase of the inverter in which a transient value of the supply voltage is greatest in absolute value, such that one changeover switch at a time is controlled to be continuously conductive, and wherein current of the intermediate circuit is determined from switching state of each changeover switch of the inverter; and in that at least one changeover switch of the network rectifier is controlled on the basis of the current of the intermediate circuit determined from the switching state of the changeover switches of the aforementioned inverter.

10. A power supply arrangement of a transport system, which transport system comprises a transport appliance, and also an electric motor drive for moving the transport appliance, which transport appliance is fitted to be moved with the electric motor, the power supply of which electric motor is fitted to occur with solid-state changeover switches of a frequency converter connected to the electric motor, which frequency converter comprises a network rectifier which is connected to an alternating electricity source of the transport system, as well as an inverter, which is fitted to phases of the electric motor, and in which changeover switches comprise an antiparallel-connected diode is fitted in parallel with a controllable switch;

wherein the aforementioned network rectifier and inverter are connected to each other with an intermediate circuit, which intermediate circuit is implemented without a passive energy storage;

a positive changeover contact of the network rectifier is controlled to be continuously conductive in a phase of the network rectifier in which a transient value of a phase voltage of the alternating electricity source is greatest, for supplying power between the alternating electricity source and the intermediate circuit;

a negative changeover contact of the network rectifier is controlled to be continuously conductive in a phase of the network rectifier in which a transient value of the phase voltage of the alternating electricity source is smallest, for supplying power between the alternating electricity source and the intermediate circuit;

the frequency converter comprises a determination for detecting an operational deviation; and control of each changeover switch of the inverter is fitted to be disconnected on the basis of a determined operational deviation; and a movement of the transport appliance is fitted to be stopped by controlling a brake of the transport appliance on the basis of the aforementioned operational deviation, wherein the inverter of the frequency converter is fitted to regulate a supply voltage of the electric machine with an inverter control for providing variable-frequency and variable-amplitude voltage or current therein; and in that each changeover switch of the inverter is controlled to be continuously conductive in each respective phase of the inverter in which a transient value of the supply voltage is greatest in absolute value, such that one changeover switch at a time is controlled to be continuously conductive, and wherein the current of the intermediate circuit is determined from the switching state of the changeover switches of the inverter; and in that at least one changeover switch of the network rectifier is controlled on the basis of the current of the intermediate circuit determined from the switching state of the changeover switches of the aforementioned inverter.

\* \* \* \* \*